(12) United States Patent
Sawai et al.

(10) Patent No.: US 7,518,803 B2
(45) Date of Patent: Apr. 14, 2009

(54) DICHROIC PRISM, AND PRISM UNIT AND IMAGE PROJECTION APPARATUS EMPLOYING SAME

(75) Inventors: Yasumasa Sawai, Yamatotakada (JP); Tomokazu Taguchi, Osaka (JP); Yasuyuki Nomura, Izumi (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 279 days.

(21) Appl. No.: 11/520,521

(22) Filed: Sep. 13, 2006

(65) Prior Publication Data

US 2007/0019299 A1    Jan. 25, 2007

Related U.S. Application Data

(63) Continuation-in-part of application No. 11/256,559, filed on Oct. 21, 2005, now abandoned.

(30) Foreign Application Priority Data

Jul. 25, 2005   (JP)   .............................. 2005-213691
Mar. 15, 2006   (JP)   .............................. 2006-070124

(51) Int. Cl.
*G02B 27/14*   (2006.01)

(52) U.S. Cl. ........................................ 359/638; 353/81

(58) Field of Classification Search ................. 359/629, 359/634, 638, 640, 833; 353/33, 81
See application file for complete search history.

(56) References Cited

U.S. PATENT DOCUMENTS 5,914,817 A * 6/1999 Browning et al. .......... 359/634

FOREIGN PATENT DOCUMENTS

| EP | 1 491 921 A1 | 12/2004 |
| JP | 6-102403 A | 4/1994 |
| JP | 11-202127 A | 7/1999 |
| JP | 2001-318221 A | 11/2001 |

* cited by examiner

*Primary Examiner*—Joseph Martinez
(74) *Attorney, Agent, or Firm*—Sidley Austin LLP (57) ABSTRACT

A dichroic film formed on a prism base member contains 10% by volume or more of a high-thermal-conductivity substance having a thermal conductivity of 20 W/mK or more at a temperature of 300 K. Preferably, the dichroic film is composed of high- and low-refractive-index layers laid alternately on one another, and the low-refractive-index layers contain 20% by volume or more of the high-thermal-conductivity substance. For lower angle-of-incidence dependence and higher light use efficiency, preferably, the following conditions: $N_L \geq 1.58$ and $N_H/N_L \geq 1.33$, where $N_L$ represents the refractive index of the low-refractive-index layers, and $N_H$ represents the refractive index of the high-refractive-index layers.

14 Claims, 2 Drawing Sheets

DICHROIC PRISM, AND PRISM UNIT AND IMAGE PROJECTION APPARATUS EMPLOYING SAME

This application is based on Japanese Patent Application No. 2006-070124 and is a continuation-in-part application based on prior U.S. patent application Ser. No. 11/256,559, filed Oct. 21, 2005, now abandoned, which is based on Japanese Patent Application No. 2005-213691, the contents of which are hereby incorporated by reference.

BACKGROUND OF THE INVENTION

1. Field of the Invention

The present invention relates to a dichroic prism, and more particularly to a dichroic prism suitable for use in an image projection apparatus that offers a high output of light.

2. Description of Related Art

In recent years, research and development have been done on projectors (image projection apparatuses) that project image data in the form of digital data by the use of a micro display device (image display device) such as a reflective liquid crystal panel or a DMD (digital micromirror device). A number of such projectors have already been put into practical use. Such projector can project high-quality images with natural colors without image deterioration, and thus have recently come to be used in movie theaters and the like in place of conventional projectors that project images distributed on film. A projector that projects images onto a large screen in a movie theater or the like is required to offer a very high output of light of 15 000 lumens or more.

Inconveniently, however, when conventional projectors are kept being used at such high outputs, the projected images gradually deteriorate. Such deterioration of projected images is particularly notable in projectors that employ a DMD, which reflects in different directions image light, that is, light for projecting images, and unnecessary light.

SUMMARY OF THE INVENTION

In view of the conventionally experienced inconvenience mentioned above, it is an object of the present invention to provide a projector that, despite employing a micro display device, does not suffer from deterioration of projected images even when kept being used at a high output.

It is another object of the present invention to provide a dichroic prism and a prism unit for use in a projector that do not suffer, under the influence of heat, from deformation on the surface of a dichroic surface or from an uneven refractive index distribution within a prism base member.

To achieve the above object, according to one aspect of the present invention, in a dichroic prism, a dichroic film formed on a prism base member contains 10% by volume or more of a high-thermal-conductivity substance having a thermal conductivity of 20 W/mK or more at a temperature of 300 K. With this design, even when the dichroic film is heated locally through absorption of light, the heat conducts all over the dichroic film, making an uneven temperature distribution less likely. Thus, even when the dichroic prism is used in an image projection apparatus that yields a high output of light of 15 000 lumens or more, or when illumination light and projection light travel along different optical paths within the prism base member, image deterioration can be minimized. Moreover, the dichroic prism according to the invention exhibits low angle-of-incidence dependence, reducing the amount of so-called stray light, that is, the light that cannot pass through the dichroic prism along the path from illumination to projection. Accordingly, the heat produced by stray light is also reduced.

The reason that the thermal conductivity is defined at a temperature of 300 K is as follows. The temperature of the surface of the dichroic prism as measured when it is in actual use is about 85° C. On the other hand, a blue dichroic film becomes whitish at temperatures of 300° C. or more. Thus, the temperature of the prism is supposed to be in the range from 85° C. to 300° C., and, in this temperature range, the relationship among the thermal conductivities of the individual materials shows no significant change.

According to another aspect of the present invention, a prism unit that separates white light into light of different wavelength bands and that integrates light of different wavelength bands into light traveling along the same optical path is provided with a first prism having a first dichroic film, a second prism having a second dichroic film, and a third prism. Here, the first dichroic film is disposed to face the second prism, and the second dichroic film is disposed to face the third prism. Moreover, at least one of the first and second dichroic films contains 10% by volume or more of a high-thermal-conductivity substance having a thermal conductivity of 20 W/mK or more at a temperature of 300 K. Moreover, the optical paths of the light of the different colors separated from the white light are different from the optical path into which the light of the different colors is later integrated together to travel along the same optical path. Furthermore, the prism unit permits a luminous flux of 15 000 lumens or more to pass therethrough.

According to still another aspect of the present invention, an image projection apparatus is provided with: a plurality of image display devices that are each fed with illumination light of a different wavelength band, each image display device then reflecting in different directions image light contributing to image projection and unnecessary light not contributing to image projection in order to display an image of a color corresponding to the wavelength band based on image data; a color separation/integration optical system that separates light from a light source into lights of different colors, that then directs the separated lights of different colors respectively to the image display devices, and that then integrates together the lights of different colors reflected respectively from the image display devices; and a projection optical system that projects onto a projection surface the image light integrated together by the color separation/integration optical system. Here, the image projection apparatus yields an output of light of 15 000 lumens or more. Moreover, the color separation/integration optical system includes a dichroic prism having a dichroic film formed on a prism base member, and the dichroic film contains 10% by volume or more of a high-thermal-conductivity substance having a thermal conductivity of 20 W/mK or more at a temperature of 300 K.

DETAILED DESCRIPTION OF PREFERRED EMBODIMENTS

The inventors of the present invention carried out an intensive study to achieve the previously stated object, and have found out why, when a projector as described earlier is kept being used at a high output, the projected image gradually deteriorates. The reason has been found to be as follows. The prism base member or dichroic film of a dichroic prism provided in the projector is heated through absorption of light, and, as the output of light increases, the amount of heat generated increases, resulting in a greatly uneven temperature distribution. This causes so large deformation on the surface of the dichroic film or so uneven a refractive index distribution within the prism base member as to influence the quality of the projected image. The present invention has been made on the basis of this finding. Hereinafter, a dichroic prism according to the present invention, and also a prism unit and an image projection apparatus employing it, will be described with reference to the accompanying drawings. It should however be understood that the present invention is not limited in any way by what is specifically described below.

Figure 1:
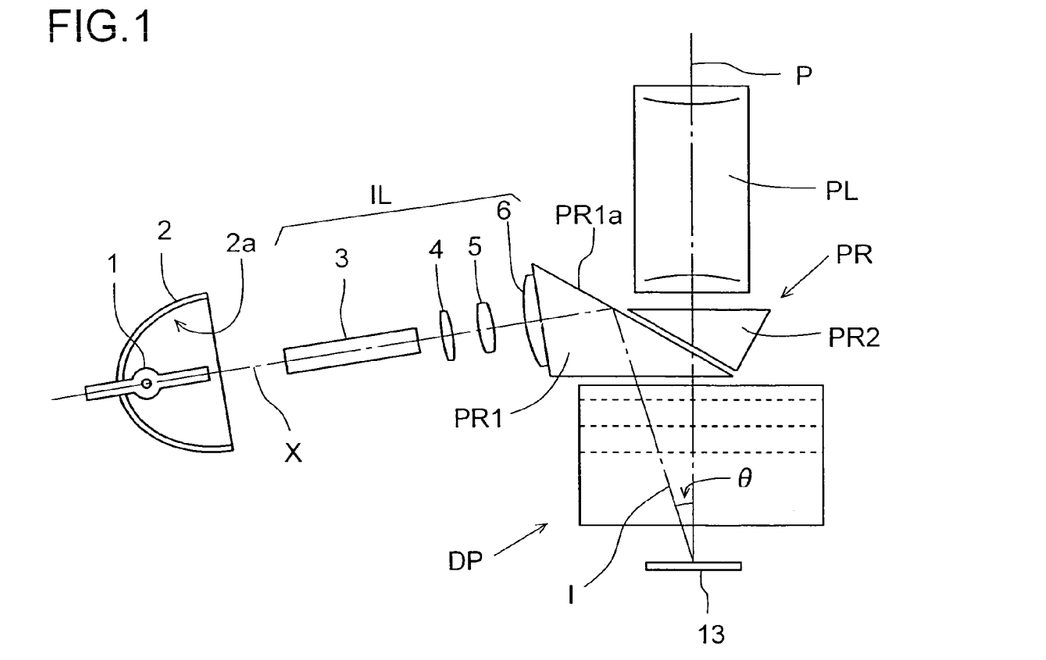
FIG. 1 is a plan view showing an outline of an example of a dichroic prism, a color separation/integration optical system (prism unit), an image projection apparatus according to the invention.

FIG. 1 is a diagram showing an outline of a projector (image projection apparatus) embodying the invention. On the path of the light emitted from a light source 1 built with a xenon lamp, on the downstream side thereof, a rod integrator 3 is disposed with the length direction thereof aligned with the optical axis X. The light source 1 is disposed at one focal point of a reflective surface 2a, in the shape of an ellipsoid of revolution, of a reflector 2. Thus, the light emitted from the light source 1 is focused at the other focal point of the reflective surface 2a, and then enters the rod integrator 3 via one end thereof. The light that has entered the rod integrator 3 undergoes repeated internal reflection so that, when the light exits the rod integrator 3 via the other end thereof, it has an even light intensity distribution.

Immediately behind the rod integrator 3, a condenser lens 4 is disposed, and, further behind, a lens 5 is disposed. The condenser lens 4 and the lens 5 together form a relay optical system. The light that has exited the rod integrator 3 is efficiently directed to the lens 5 so as to enter, via an entrance lens 6, a TIR (total internal reflection) prism PR. The components starting with the rod integrator 3 and ending with the entrance lens 6 together form an illumination optical system IL.

The TIR prism PR is composed of a first prism PR1 and a second prism PR2, each substantially in the shape of a triangular prism. An air gap layer is secured between the slanted surfaces of those prisms. The TIR prism PR separates, with respect to a DMD, the input light thereto and the output light therefrom. The first prism PR1 totally reflects, with a side surface PR1a thereof, the illumination light that has exited the illumination optical system IL in order to make the light enter a color separation/integration optical system (prism unit) DP. The color separation/integration optical system DP separates the illumination light into lights of different colors, namely red, green, and blue, and then, after the lights of different colors are modulated by the DMD, integrates them together.

Figure 2:
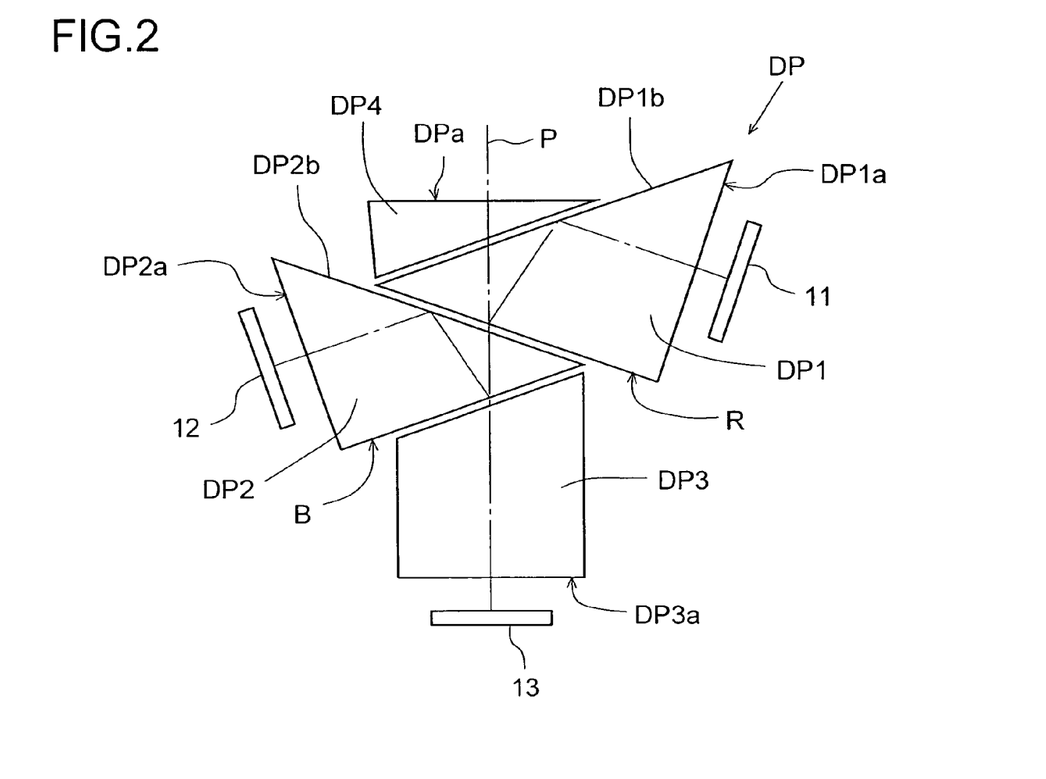
FIG. 2 is a vertical sectional view of the dichroic prism and the color separation/integration optical system (prism unit) shown in FIG. 1.

FIG. 2 is a side sectional view of the color separation/integration optical system DP. The color separation/integration optical system DP is composed of a first prism (dichroic prism) DP1 substantially in the shape of a triangular prism, a second prism (dichroic prism) DP2 substantially in the shape of a triangular prism, a third prism DP3 substantially in the shape of a rectangular prism, and a clear prism DP4 substantially in the shape of triangular prism. The surface of the first prism DP1 facing the second prism DP2 functions as a dichroic surface, on which surface a dichroic film R that reflects red light is formed. Between the first prism DP1 and the second prism DP2, an air gap layer is secured. On the other hand, the surface of the second prism DP2 facing the third prism DP3 functions as a dichroic surface, on which surface a dichroic film B that reflects blue light is formed. Also between the second prism DP2 and the third prism DP3, an air gap layer is secured. The positions in which the dichroic films R and B are formed may be reversed. In this embodiment, the color separation/integration optical system DP includes the clear prism DP4. This clear prism DP4, however, may be omitted, although its provision is preferable from the viewpoint of reducing the angle of incidence of the illumination light with respect to the dichroic film R and thereby reducing the angle-of-incidence dependence of the dichroic film R. In a case where the clear prism DP4 is not used, to reduce the angle-of-incidence dependence of the dichroic film R, it is advisable to form the dichroic film B on the first prism DP1 and form the dichroic film R on the second prism DP2.

In this color separation/integration optical system DP, the dichroic films R and B are formed to reach areas where no prism is disposed to face them. In these areas, the dichroic films make contact with air in convention and is thereby air-cooled. Since, as will be described later, the dichroic films have high thermal conductivity, their being cooled in the areas where no prism faces them permits them to be cooled also in the areas where they make contact with the air gap layers, where no convection occurs. This effectively reduces the rise in the temperature of the dichroic films as a whole. The reason that the air gap layers are secured adjacent to the dichroic films is that, since a large amount of light is projected, if prisms are bonded together with adhesive, the adhesive absorbs light and may eventually be burnt.

The illumination light enters the clear prism DP4 via the top surface thereof serving as the entrance/exit surface DPa. Then, red light is reflected on the dichroic film R, while other light, namely blue and green lights, is transmitted therethrough. The red light reflected on the dichroic film R is then totally reflected on a side surface DP1b of the first prism DP1 to exit the first prism DP1 via the entrance/exit surface DP1a thereof, and then illuminates a DMD 11 for red light. As an image display device, a reflective liquid crystal display apparatus may be used instead of a DMD.

On the other hand, of the blue and green lights that have been transmitted through the dichroic film R, the blue light is reflected on the dichroic film B on the second prism DP2, while green light is transmitted therethrough. The blue light reflected on the dichroic film B is then totally reflected on a side surface DP2b of the second prism DP2 to exit the second prism DP2 via the entrance/exit surface DP2a thereof, and then illuminates a DMD 12 for blue light. The green light transmitted through the dichroic film B exits the third prism DP3 via an entrance/exit surface DP3a thereof, and then illuminates a DMD 13 for green light.

Each DMD has a number of micromirrors (unillustrated) arranged one for each pixel. Each micromirror can be inclined between ±12°. When a micromirror is inclined at 12° toward the illumination optical axis I, it reflects the illumination light, which is incident thereon at an angle of incidence of $\theta=24°$, in the direction perpendicular to the DMD (in the direction of the projection optical axis P), the thus reflected light forming projection light (ON light). By contrast, when a micromirror is inclined at 12° away from the illumination optical axis I, it reflects the illumination light at an angle of emergence of 48°, the thus reflected light forming OFF light. In this way, the illumination light is modulated.

Next, a description will be given of the optical path of the projection light from each DMD, that is, the integration of lights of different colors. The red projection light reflected from the DMD 11 for red light enters the first prism DP1 via the entrance/exit surface DP1a thereof, is then totally reflected on the side surface DP1b of the first prism DP1, and is then again reflected on the dichroic film R. The blue projection light reflected from the DMD 12 for blue light enters the first prism DP2 via the entrance/exit surface DP2a thereof, is then totally reflected on the side surface DP2b of the first prism DP2, and is then again reflected on the dichroic film B. The green projection light reflected from the DMD 13 for green light enters the third prism DP3 via the entrance/exit surface DP3a thereof, and is then transmitted through the dichroic film B and then through the dichroic film R.

In this way, the red, blue, and green projection lights are integrated into light traveling along the same optical path P, and the integrated light then exits the clear prism DP4 via the entrance/exit surface DPa thereof to enter the TIR prism PR. This integrated projection light does not fulfill the conditions for total reflection with any of the prisms constituting the TIR prism PR. Thus, the integrated projection light is then transmitted through the TIR prism PR and the air gap layer, and is then, through the projection light composed of a plurality of lenses or the like, onto an unillustrated screen. Here, the lenses or the like constituting the projection light are omitted from illustration.

In the image projection apparatus described above, the dichroic prism is used to separate illumination light into lights of different colors, and also to integrate modulated lights of different colors together. Needless to say, the dichroic prism may alternatively be used only to integrate modulated lights of different colors together.

Next, a description will be given of practical structures of the dichroic films R and B formed on the first and second prisms DP1 and DP2, respectively. As described above, in the color separation/integration optical system, illumination light and projection light travel along different optical paths, and the amount of illumination light is larger than that of projection light. Thus, the amount of heat generated through absorption of light in the dichroic films and the prism base members is larger along the path of illumination light. This causes an uneven temperature distribution over the dichroic films and the prism base members, and, as this uneven temperature distribution becomes severer, the deformation on the surface of the dichroic films and the uneven refractive index distribution within the prism base members become so serious as to influence the projected image.

In particular, when a dim image is projected, only a small amount of light travels along the optical path of projection light, and thus the difference between the amount of illumination light and that of projection light is greatest, resulting in accordingly severe surface deformation and unevenness in the refractive index distribution, and hence accordingly serious deterioration of projection performance. Moreover, since illumination light and projection light are incident on the dichroic films at different angles of incidence, the angle-of-incidence dependence of the dichroic films causes some light to fail to pass through the dichroic prisms along the path from illumination light to projection light and become stray light, causing deterioration of the quality of the projected image and excessive accumulation of heat.

To overcome these inconveniences, according to the present invention, the dichroic films are given a high thermal conductivity by being made to contain 10% per volume or more of a high-thermal-conductivity substance having a thermal conductivity of 20 W/mK at a temperature of 300 K. This makes it possible to successfully reduce a local rise in temperature in the dichroic films and the prism base members, and also to successfully reduce the angle-of-incidence dependence of the dichroic films.

The reason that the dichroic films are made to contain 10% per volume or more of a high-thermal-conductivity substance is as follows. Assume, for example, that the ratio of the thermal conductivity of the high-thermal-conductivity substance to that of another film material is 4:1 (as will be described later, the ratio is higher in reality). Take, for example, the first prism DP1 used to reflect red light in Example 1 described later. Here, the dichroic film contains 57.5% by volume of $Al_2O_3$ as a high-thermal-conductivity substance. As a result, the dichroic film as a whole has a thermal conductivity 2.73 times as high as the thermal conductivity it would have if the entire dichroic film were formed of a film material other than $Al_2O_3$. On the other hand, a projector employing a conventional dichroic prism offers an output of light of 15 000 lumens at the maximum, and suffers from deterioration of projected images at a higher output. By contrast, it has been confirmed that a projector employing the dichroic prism of Example 1 is free from deterioration of projected images even when yielding an output of light of at least 24 000 lumens. This increase in the output of light with which the dichroic prism can withstand is believed to result from the increase in the thermal conductivity of the dichroic film. That is, as the thermal conductivity of the dichroic film doubles, the withstand light output is supposed to increase by at least 5 215 lumens ((24 000−15 000)/(2.73−1)=5 215 lumens). The reason that the dichroic film for reflecting red light is taken up as an example here is that, in the evaluation of images described later, image deterioration is more notable with red light than with lights of the other colors, and therefore that the thermal conductivity of the dichroic film for reflecting red light, which has a larger influence on images, is considered to be more important.

Now consider the second prism DP2 that reflects blue light. Here, since the dichroic film contains 36.0% by volume of $Al_2O_3$, and therefore the dichroic film as a whole has a thermal conductivity 2.08 times as high as the thermal conductivity it would have if the entire dichroic film were formed of a film material other than $Al_2O_3$. Calculating the above-mentioned withstand light output on the basis of this blue-reflecting dichroic film shows that, as the thermal conductivity of the dichroic film doubles, the withstand light output is supposed to increase by at least 8 345 lumens ((24 000−15 000)/(2.08−1)=8 345 lumens). Here, "light output" denotes the maximum amount of projected light, that is, light projected onto the screen, and "lumen" refers to the ANSI lumen measured in compliance with the relevant ANSI (American National Standard Institute) standards.

On the above basis, the thermal conductivity, the increase in the withstand light output, and the change in the withstand light output as supposed in relation to the $Al_2O_3$ content (% by volume) are calculated by the following formulae:

Thermal Conductivity=4×$Al_2O_3$ Content+1×(1−$Al_2O_3$ Content)

Increase in Withstand Light Output Based On Red-reflecting Dichroic Film=(Thermal Conductivity−1)×5 215

Increase in Withstand Light Output Based On Blue-reflecting Dichroic Film=(Thermal Conductivity−1)×8 345

Withstand Light Output=15 000+Increase in Withstand Light Output

Table 1 shows that, with an $Al_2O_3$ content of 10.0% by volume or more, satisfactory image quality is expected to be obtained at a light output of 15 000 lumens or more. On the other hand, based on the examples presented later, it is further preferable that the red-reflecting dichroic film R contain 50% by volume or more of $Al_2O_3$; it is further preferable that the blue-reflecting dichroic film B contain 30% by volume or more of $Al_2O_3$. With the examples presented later, no image evaluation has been performed at brightnesses over 24 000 lumens, and thus satisfactory image quality may be obtained at higher outputs. If so, satisfactory image quality may be obtained at smaller $Al_2O_3$ contents. Satisfactory image quality can be obtained at a smaller $Al_2O_3$ content on the basis of the blue-reflecting dichroic film than on the basis of the red-reflecting dichroic film. In actual image evaluation, it has been confirmed that image deterioration is greater with red light than with light of the other colors, and this is considered to indicate that the thermal conductivity of the red-reflecting dichroic film is more important because it greatly affects the red-light image.

Since a projector as used in a movie theater or the like is required to yield an output of light of about 20 000 lumens, it needs to be designed to yield an output of light at least 5 000 lumen higher than a conventional projector (yielding an output of light of 15 000 lumens). To achieve this, the thermal conductivity of the red-reflecting dichroic film needs to be increased by a factor of, preferably, 1.96(=(5 000/5 215)+1) or more, and the thermal conductivity of the blue-reflecting dichroic film needs to be increased by a factor of, preferably, 1.60(=(5 000/8 345)+1) or more. To increase the thermal conductivity of the red-reflecting dichroic film by a factor of 1.96 or more, based on the formula $4X+(1-X)=1.96$, it is calculated that X=0.32; that is, the content of $Al_2O_3$ needs to be, preferably, 32% by volume or more. To increase the thermal conductivity of the blue-reflecting dichroic film by a factor of 1.60 or more, based on the formula $4X+(1-X)=1.60$, it is calculated that X=0.20; that is, the content of $Al_2O_3$ needs to be, preferably, 20% by volume or more.

Used in the present invention as the high-thermal-conductivity substance having a thermal conductivity of 20 W/mk at a temperature of 300 K is, for example, $Al_2O_3$ (25 W/mK) or DLC (diamond-like carbon), 20 to 40 W/mK). For comparison, the thermal conductivities of conventional thin film materials are as follows: $TiO_2$, 2.5 to 5 W/mK; $SiO_2$, 1.4 W/mK; $MgF_2$, 0.3 W/mK; $ZrO_2$, 1.9 to 2.9 W/mK.

The dichroic films are each composed of high-refractive-index layers and low-refractive-index layers laid alternately on one another. Either the high-refractive-index layers or the low-refractive-index layers or both may be made to contain $Al_2O_3$. Since $Al_2O_3$ has a refractive index of 1.58 to 1.67, however, it is preferable that the low-refractive-index layers be made to contain it in combination with another high-refractive-index material (with a refractive index of 2.2 or more). The reasons are as follows. The greater the difference between the refractive indices of the high- and low-refractive-index layers, the smaller the number of layers needed to obtain an excellent reflection characteristic. Moreover, the higher the refractive index of the low-refractive-index layers, the lower the angle-of-incidence dependence of a dichroic film. For example, if the high-refractive-index layers are made to contain $Al_2O_3$, the low-refractive-index layers need to be formed of a material having a refractive index of 1.38 or less. This makes it impossible to secure a sufficiently wide bandwidth, and makes unduly high the angle-of-incidence dependence of a dichroic film.

It is preferable that the low-refractive-index layers have a refractive index $N_L$ of 1.58 or more. If the refractive index of the low-refractive-index layers is lower than 1.58, its difference from the refractive index of the high-refractive-index layers is too great, resulting in unduly high angle-of-incidence dependence. As angle-of-incidence dependence grows, color purity degrades, image quality deteriorates, and light use efficiency lowers. Lower light use efficiency resulting from a degraded dichroic characteristic causes so-called ghosts, and causes unnecessary light to pass through a prism and thereby raise the temperature thereof. It is preferable that the ratio of the refractive index $N_H$ of the high-refractive-index layers to the refractive index $N_L$ of the low-refractive-index layers be 1.33 or more. If the refractive index ratio $N_H/N_L$ is lower than 1.33, while angle-of-incidence dependence is satisfactorily low, a satisfactory dichroic characteristic can be obtained only in a rather narrow wavelength bandwidth. This wavelength bandwidth can be widened by increasing the number of thin films, but doing so increases variations during fabrication, making it difficult to obtain a stabile characteristic, and also increases the fabrication cost.

The low-refractive-index layers may be formed of $Al_2O_3$ alone, or in combination with another material having a different refractive index with a view to obtaining a desired refractive index.

The dichroic films may be formed by any conventionally well-known process, such as vacuum deposition, IAD (ion assisted deposition), IP (ion plating), or sputtering. A high thermal conductivity can be obtained, as described previously, by forming a high-density dichroic film, and, for this purpose, it is recommended to perform film formation by IAD, IP, or sputtering.

Used as the prism base members in the present invention are, preferably, those whose mean absorptance every 40 mm thickness thereof in the wavelength range from 400 nm to 800 nm is 0.5% or less. With a mean absorptance higher than 0.5%, a prism base member is heated, through absorption of light, so much as to cause an uneven refractive index distribution.

EXAMPLES

Example 1

A dichroic film having a layer structure as shown in Table 2 was formed on a surface of a prism base member (having an absorptance of 0.29%). This dichroic film was designed to reflect red light and transmit blue and green lights, and had high-refractive-index layers and low-refractive-index layers laid alternately on one another by IAD. The high-refractive-index layers were $Nb_2O_5$ films, and the low-refractive-index layers were $Al_2O_3$ films. The volume proportion of $Al_2O_3$ in this dichroic film was 57.5%, and its volume proportion in the low-refractive-index layers was 100%. Here, the $Al_2O_3$ content in the dichroic film was calculated based on the film structure shown in Table 2. The film thickness of the entire film is 2 379.87 nm and the total $Al_2O_3$ film thickness is 1 369.02 nm; hence the $Al_2O_3$ content is calculated as 1 369.02/2 379.87=57.5% by volume. In this example, the low-refractive-index layers are formed of $Al_2O_3$, and therefore the $Al_2O_3$ content in the low-refractive-index layers is 100% by volume. The refractive index ratio $N_H/N_L$ between the high- and low-refractive-index layers was 1.34. This dichroic prism was used as the first prism DP1 (shown in FIG. 2).

A dichroic film having a layer structure as shown in Table 3 was formed on a surface of a prism base member (having an absorptance of 0.29%). This dichroic film was designed to reflect blue light and transmit green light, and had high-refractive-index layers and low-refractive-index layers laid alternately on one another by IAD just as described above. The high-refractive-index layers were $TiO_2$ films, and the low-refractive-index layers were films of a mixture of $La_2O_3$ and $Al_2O_3$. The mix ratio of $La_2O_3$ to $Al_2O_3$ was 1:3.3 by number of molecules, and used as the mixture was Substance M2 manufactured by Merck KGaA, Germany. Based on this ratio by number of molecules, by using the molecular weight and the specific gravity, the volume proportion of $Al_2O_3$ was calculated as follows: the volume proportion of $Al_2O_3$ in this dichroic film was 36.0%, and its volume proportion in the low-refractive-index layers was 62.7%.

The $Al_2O_3$ content in the dichroic film was calculated based on the film structure shown in Table 3. In Table 3, the low-refractive-index layers are formed of a mixture of $La_2O_3$ and $TiO_2$, and their mix ratio was 1:3.3 by number of molecules. Here, the volume proportion of $Al_2O_3$ was calculated based on the volume per unit number of molecules of each substance calculated from its molecular weight and specific gravity. Used in the calculation were the following values: the molecular weight of $La_2O_3$, 325.81; the molecular weight of $Al_2O_3$, 101.96; the specific gravity of $La_2O_3$, 6.51; and the specific gravity of $Al_2O_3$ 4.00. Hence, the volume per unit number of molecules of $La_2O_3$ is calculated as 325.81/6.51=50.05, and the volume per unit number of molecules of $Al_2O_3$ as 101.96/4.00=25.49. Since the ratio by number of molecules is 1:3.3, the volume proportion of $Al_2O_3$ in the low-refractive-index layers is given as $(3.3 \times 25.49)/(50.05+3.3 \times 25.49)=62.7\%$ by volume. Since the film thickness of the entire film is 1 725.40 nm and the total film thickness of the mixture of $La_2O_3$ and $Al_2O_3$ is 989.36 nm, the volume proportion of $Al_2O_3$ in the entire film is calculated as $(989.36 \times 62.7\%)/1\,725.40=36.0\%$ by volume. The refractive index ratio $N_H/N_L$ between the high- and low-refractive-index layers was 1.38. This dichroic prism was used as the second prism DP2 (shown in FIG. 2).

By using the first and second prisms DP1 and DP2 fabricated as described above, the color separation/integration optical system (prism unit) shown in FIGS. 1 and 2 was assembled, and was built into an image projection apparatus. Then, by using as a light source a 6 kW xenon lamp, lights of different colors, namely red (R), green (G), and blue (B), were projected onto a screen, and the quality of the resulting images was visually evaluated. The grades of evaluation are shown in Table 4, and the results are shown in Table 5. The light output during the evaluation was 24 000 lumens.

Figure 3:
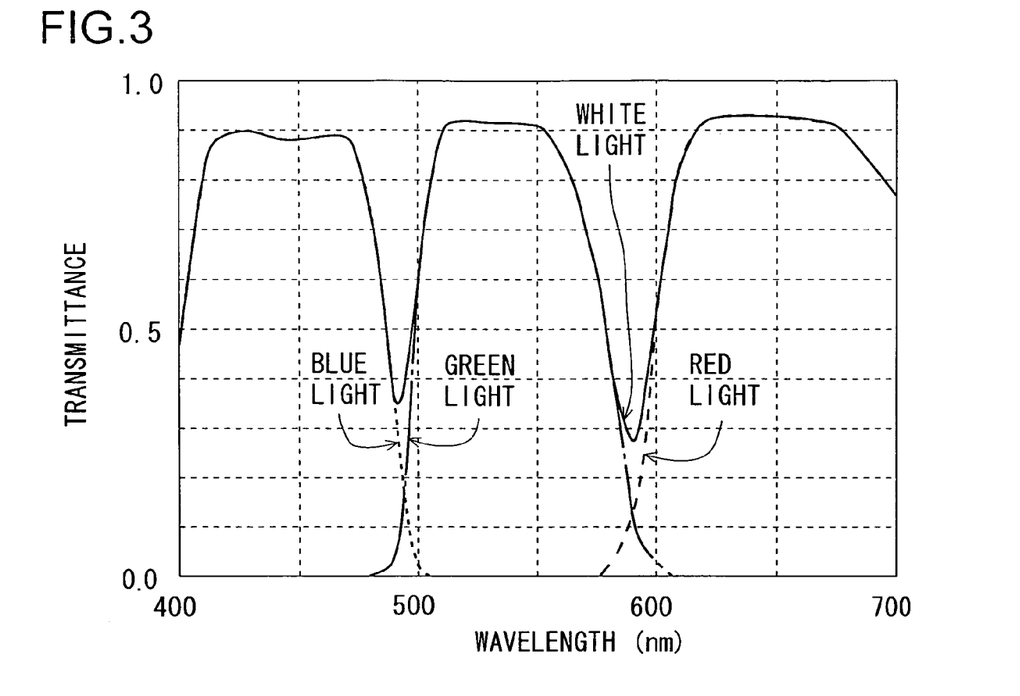
FIG. 3 is a diagram showing the transmittance observed across the pass from illumination light to projection light in the image projection apparatus of Example 1 of the invention.

FIG. 3 is a graph showing the dichroic characteristic of this image projection apparatus. FIG. 3 shows the transmittance characteristic from illumination light to projection light, with the horizontal axis representing the wavelength (nm) and the vertical axis the transmittance.

As will be clear from Table 5, the image projection apparatus employing the dichroic prisms and the prism units of Example 1 offered satisfactory image quality both immediately after and one hour after lighting was started. Moreover, as will be clear from FIG. 3, the prism units exhibited low angle-of-incidence dependence, resulting in small transmittance losses between the wavelength bands of lights of different colors. This made it possible to obtain bright projected images with little stray light.

Example 2

Except that the prism base members had an absorptance of 0.49%, the first and second prisms DP1 and DP2 were fabricated in the same manner as in Example 1. Then, as in Example 1, by using the thus fabricated first and second prisms DP1 and DP2, the prism units shown in FIGS. 1 and 2 were assembled, and were built into an image projection apparatus. Then, by using as a light source a 6 kW xenon lamp, lights of different colors, namely red (R), green (G), and blue (B), were projected onto a screen, and the quality of the resulting images was visually evaluated. The results of evaluation are shown in Table 6. Here again, the light output during the evaluation was 24 000 lumens.

As will be clear from Table 6, the image projection apparatus employing the dichroic prisms and the prism units of Example 2 offered satisfactory image quality immediately after lighting was started. One hour after lighting was started, the quality of the images of lights of different colors was still practically acceptable, though slightly lower than that obtained in Example 1.

Comparative Example 1

A dichroic film having a layer structure as shown in Table 7 was formed on a surface of a prism base member (having an absorptance of 0.49%). This dichroic film was designed to reflect red light and transmit blue and green lights, and had high-refractive-index layers and low-refractive-index layers laid alternately on one another by IAD. The high-refractive-index layers were films of a mixture of $La_2O_3$ and $TiO_2$, and the low-refractive-index layers were $SiO_2$ films. The volume proportion of $Al_2O_3$ in this dichroic film was 2.4%. The refractive index ratio $N_H/N_L$ between the high- and low-refractive-index layers was 1.49. This dichroic prism was used as the first prism DP1 (shown in FIG. 2).

A dichroic film having a layer structure as shown in Table 8 was formed on a surface of a prism base member (having an absorptance of 0.49%). This dichroic film was designed to reflect blue light and transmit green light, and had high-refractive-index layers and low-refractive-index layers laid alternately on one another by IAD just as described above. The high-refractive-index layers were films of a mixture of $La_2O_3$ and $TiO_2$, and the low-refractive-index layers were $SiO_2$ films. The volume proportion of $Al_2O_3$ in this dichroic film was 0%. The refractive index ratio $N_H/N_L$ between the high- and low-refractive-index layers was 1.41. This dichroic prism was used as the second prism DP2 (shown in FIG. 2).

Figure 4:
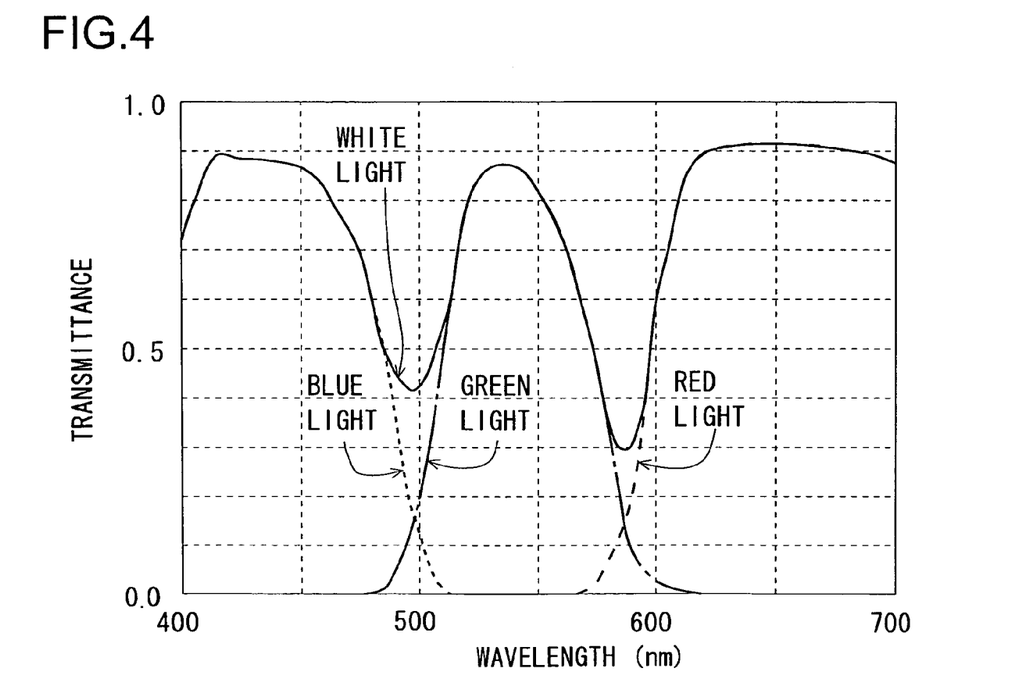
FIG. 4 is a diagram showing the transmittance observed across the pass from illumination light to projection light in the image projection apparatus of Comparative Example 1

By using the first and second prisms DP1 and DP2 fabricated as described above, the prism unit shown in FIGS. 1 and 2 was assembled, and was built into an image projection apparatus. Then, by using as a light source a 6 kW xenon lamp, lights of different colors, namely red (R), green (G), and blue (B), were projected onto a screen, and the quality of the resulting images was visually evaluated. The grades of evaluation are shown in Table 4, and the results are shown in Table 9. The light output during the evaluation was 20 000 lumens Moreover, FIG. 4 is a graph showing the dichroic characteristic of this image projection apparatus.

As will be clear from Table 9, the image projection apparatus employing the dichroic prisms and the prism units of Comparative Example 1 offered satisfactory image quality immediately after lighting was started. One hour after lighting was started, however, image quality deteriorated to a practically unacceptable level. Moreover, as will be clear from FIG. 4, the prism units exhibited high angle-of-incidence dependence, resulting in gentle slopes in the rising portions of the transmittance curves for lights of different colors, and hence large transmittance losses between the wavelength bands of lights of different colors.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

TABLE 1

| Al$_2$O$_3$ Content (% by volume) | Thermal Conductivity (times) | Based on Red-Reflecting Dichroic Film | | Based on Blue-Reflecting Dichroic Film | |
|---|---|---|---|---|---|
| | | Increase in Withstand Light Output (lumens) | Withstand Light Output (lumens) | Increase in Withstand Light Output (lumens) | Withstand Light Output (lumens) |
| 10 | 1.30 | 1,565 | 16,565 | 2,503 | 17,503 |
| 15 | 1.45 | 2,347 | 17,347 | 3,755 | 18,755 |
| 20 | 1.60 | 3,129 | 18,129 | 5,007 | 20,007 |
| 25 | 1.75 | 3,911 | 18,911 | 6,259 | 21,259 |
| 30 | 1.90 | 4,694 | 19,694 | 7,510 | 22,510 |
| 35 | 2.05 | 5,476 | 20,476 | 8,762 | 23,762 |
| 40 | 2.20 | 6,258 | 21,258 | 10,014 | 25,014 |
| 45 | 2.35 | 7,040 | 22,040 | 11,265 | 26,265 |
| 50 | 2.50 | 7,823 | 22,823 | 12,517 | 27,517 |
| 55 | 2.65 | 8,605 | 23,605 | 13,769 | 28,769 |
| 60 | 2.80 | 9,387 | 24,387 | 15,020 | 30,020 |
| 65 | 2.95 | 10,169 | 25,169 | 16,272 | 31,272 |
| 70 | 3.10 | 10,952 | 25,952 | 17,524 | 32,524 |

TABLE 2

| | Refractive Index | Film Thickness (nm) |
|---|---|---|
| Prism Base Member | 1.517 | |
| Al$_2$O$_3$ | 1.66 | 56.57 |
| Nb$_2$O$_5$ | 2.23 | 93.31 |
| Al$_2$O$_3$ | 1.66 | 105.41 |
| Nb$_2$O$_5$ | 2.23 | 86.20 |
| Al$_2$O$_3$ | 1.66 | 100.04 |
| Nb$_2$O$_5$ | 2.23 | 79.66 |
| Al$_2$O$_3$ | 1.66 | 106.94 |
| Nb$_2$O$_5$ | 2.23 | 74.07 |
| Al$_2$O$_3$ | 1.66 | 105.60 |
| Nb$_2$O$_5$ | 2.23 | 77.59 |
| Al$_2$O$_3$ | 1.66 | 100.62 |
| Nb$_2$O$_5$ | 2.23 | 76.61 |
| Al$_2$O$_3$ | 1.66 | 105.71 |
| Nb$_2$O$_5$ | 2.23 | 73.75 |
| Al$_2$O$_3$ | 1.66 | 103.59 |
| Nb$_2$O$_5$ | 2.23 | 78.20 |
| Al$_2$O$_3$ | 1.66 | 100.26 |
| Nb$_2$O$_5$ | 2.23 | 75.73 |
| Al$_2$O$_3$ | 1.66 | 108.42 |
| Nb$_2$O$_5$ | 2.23 | 72.91 |
| Al$_2$O$_3$ | 1.66 | 104.13 |
| Nb$_2$O$_5$ | 2.23 | 82.98 |
| Al$_2$O$_3$ | 1.66 | 93.24 |
| Nb$_2$O$_5$ | 2.23 | 85.27 |
| Al$_2$O$_3$ | 1.66 | 110.86 |
| Nb$_2$O$_5$ | 2.23 | 54.57 |
| Al$_2$O$_3$ | 1.66 | 67.63 |
| Air | 1.0 | |

TABLE 3

| | Refractive Index | Film Thickness (nm) |
|---|---|---|
| Prism Base Member | 1.517 | |
| TiO$_2$ | 2.41 | 15.90 |
| La$_2$O$_3$ + Al$_2$O$_3$ | 1.74 | 75.60 |
| TiO$_2$ | 2.41 | 40.26 |
| La$_2$O$_3$ + Al$_2$O$_3$ | 1.74 | 67.63 |
| TiO$_2$ | 2.41 | 39.35 |
| La$_2$O$_3$ + Al$_2$O$_3$ | 1.74 | 70.21 |
| TiO$_2$ | 2.41 | 41.94 |
| La$_2$O$_3$ + Al$_2$O$_3$ | 1.74 | 71.43 |
| TiO$_2$ | 2.41 | 41.84 |
| La$_2$O$_3$ + Al$_2$O$_3$ | 1.74 | 70.60 |
| TiO$_2$ | 2.41 | 41.75 |
| La$_2$O$_3$ + Al$_2$O$_3$ | 1.74 | 71.07 |
| TiO$_2$ | 2.41 | 42.23 |
| La$_2$O$_3$ + Al$_2$O$_3$ | 1.74 | 71.16 |
| TiO$_2$ | 2.41 | 41.93 |
| La$_2$O$_3$ + Al$_2$O$_3$ | 1.74 | 70.65 |
| TiO$_2$ | 2.41 | 41.93 |
| La$_2$O$_3$ + Al$_2$O$_3$ | 1.74 | 71.16 |
| TiO$_2$ | 2.41 | 42.28 |
| La$_2$O$_3$ + Al$_2$O$_3$ | 1.74 | 71.14 |
| TiO$_2$ | 2.41 | 41.84 |
| La$_2$O$_3$ + Al$_2$O$_3$ | 1.74 | 70.67 |
| TiO$_2$ | 2.41 | 41.99 |
| La$_2$O$_3$ + Al$_2$O$_3$ | 1.74 | 71.56 |
| TiO$_2$ | 2.41 | 42.18 |
| La$_2$O$_3$ + Al$_2$O$_3$ | 1.74 | 70.16 |
| TiO$_2$ | 2.41 | 39.03 |
| La$_2$O$_3$ + Al$_2$O$_3$ | 1.74 | 66.32 |
| TiO$_2$ | 2.41 | 40.96 |
| SiO$_2$ | 1.47 | 140.63 |
| Air | 1.0 | |

TABLE 4

| Grade | Image Quality Evaluation | Acceptability |
|---|---|---|
| 1 | Excellent | Acceptable |
| 2 | Good | Acceptable |
| 3 | Fair | Acceptable |
| 4 | Poor | Unacceptable |
| 5 | Very Poor | Unacceptable |

TABLE 5

| | Immediately After Lighting | One Hour After Lighting |
|---|---|---|
| R | 1 | 2 |
| G | 1 | 1 |
| B | 1 | 1 |

TABLE 6

| | Immediately After Lighting | One Hour After Lighting |
|---|---|---|
| R | 1 | 3 |
| G | 1 | 2 |
| B | 1 | 2 |

TABLE 9

| | Immediately After Lighting | One Hour After Lighting |
|---|---|---|
| R | 1 | 5 |
| G | 1 | 4 |
| B | 1 | 4 |

TABLE 7

| | Refractive Index | Film Thickness (nm) |
|---|---|---|
| Prism Base Member | 1.517 | |
| $Al_2O_3$ | 1.62 | 53.38 |
| $La_2O_3 + TiO_2$ | 2.07 | 91.91 |
| $SiO_2$ | 1.47 | 129.42 |
| $La_2O_3 + TiO_2$ | 2.07 | 91.91 |
| $SiO_2$ | 1.47 | 117.65 |
| $La_2O_3 + TiO_2$ | 2.07 | 83.55 |
| $SiO_2$ | 1.47 | 117.65 |
| $La_2O_3 + TiO_2$ | 2.07 | 83.55 |
| $SiO_2$ | 1.47 | 117.65 |
| $La_2O_3 + TiO_2$ | 2.07 | 83.55 |
| $SiO_2$ | 1.47 | 117.65 |
| $La_2O_3 + TiO_2$ | 2.07 | 83.55 |
| $SiO_2$ | 1.47 | 117.65 |
| $La_2O_3 + TiO_2$ | 2.07 | 83.55 |
| $SiO_2$ | 1.47 | 117.65 |
| $La_2O_3 + TiO_2$ | 2.07 | 83.55 |
| $SiO_2$ | 1.47 | 117.65 |
| $La_2O_3 + TiO_2$ | 2.07 | 83.55 |
| $SiO_2$ | 1.47 | 117.65 |
| $La_2O_3 + TiO_2$ | 2.07 | 87.72 |
| $SiO_2$ | 1.47 | 123.53 |
| $La_2O_3 + TiO_2$ | 2.07 | 87.72 |
| MgF | 1.385 | 68.69 |
| Air | 1.0 | |

TABLE 8

| | Refractive Index | Film Thickness (nm) |
|---|---|---|
| Prism Base Member | 1.517 | |
| $La_2O_3 + TiO_2$ | 2.07 | 21.26 |
| MgF | 1.385 | 76.91 |
| $La_2O_3 + TiO_2$ | 2.07 | 51.46 |
| $SiO_2$ | 1.47 | 69.31 |
| $La_2O_3 + TiO_2$ | 2.07 | 55.94 |
| $SiO_2$ | 1.47 | 78.76 |
| $La_2O_3 + TiO_2$ | 2.07 | 55.94 |
| $SiO_2$ | 1.47 | 78.76 |
| $La_2O_3 + TiO_2$ | 2.07 | 55.94 |
| $SiO_2$ | 1.47 | 78.76 |
| $La_2O_3 + TiO_2$ | 2.07 | 55.94 |
| $SiO_2$ | 1.47 | 78.76 |
| $La_2O_3 + TiO_2$ | 2.07 | 55.94 |
| $SiO_2$ | 1.47 | 78.76 |
| $La_2O_3 + TiO_2$ | 2.07 | 55.94 |
| $SiO_2$ | 1.47 | 78.76 |
| $La_2O_3 + TiO_2$ | 2.07 | 55.94 |
| $SiO_2$ | 1.47 | 78.76 |
| $La_2O_3 + TiO_2$ | 2.07 | 55.94 |
| $SiO_2$ | 1.47 | 78.76 |
| $La_2O_3 + TiO_2$ | 2.07 | 55.94 |
| $SiO_2$ | 1.47 | 78.76 |
| $La_2O_3 + TiO_2$ | 2.07 | 60.41 |
| $SiO_2$ | 1.47 | 90.29 |
| $La_2O_3 + TiO_2$ | 2.07 | 20.13 |
| Air | 1.0 | |

What is claimed is:

1. A prism unit that separates white light into light of different wavelength bands and that integrates light of different wavelength bands into light traveling along a same optical path, the prism unit comprising:

a TIR prism having a side surface for totally reflecting input light, and a color separation/integration optical system for separating input light, reflected by the TIR prism, and traveling along an input optical path, into light of three different colors, then integrating the separated light of the three different colors into light traveling along a same output optical path, and then outputting the integrated light as output light toward the TIR prism, the input optical path being different from the output optical path;

the color separation/integration optical system including:

a first prism having a first prism base member and a first dichroic film formed on the first prism base member, a second prism having a second prism base member and a second dichroic film formed on the second prism base member, and a third prism having a third prism base member, the first dichroic film being disposed to face the second prism, the second dichroic film being disposed to face the third prism, at least one of the first and second dichroic films containing 10% by volume or more of a high-thermal-conductivity substance having a thermal conductivity of 20 W/mK or more at a temperature of 300 K, and the prism unit permitting a luminous flux of 15 000 lumens or more to pass therethrough.

2. The prism unit of claim 1, wherein the high-thermal-conductivity substance is $Al_{12}O_3$.

3. The prism unit of claim 1, wherein the first and second dichroic films each include high-refractive-index layers and low-refractive-index layers laid alternately on one another, the low-refractive-index layers and high-refractive-index layers fulfilling the following conditions:

$$N_L \geq 1.58 \quad (1)$$

$$N_H/N_L \geq 1.33 \quad (2)$$

where $N_L$ represents a refractive index of the low-refractive-index layers; and $N_H$ represents a refractive index of the high-refractive-index layers.

4. The prism unit of claim 3, wherein variation of a cut-off frequency at which a transmittance of 50% is obtained 1 nm or less within a humidity range from 0% to 95% and within a temperature range of ±25° C.

5. The prism unit of claim 4, wherein, for each of the dichroic films, an air gap layer is provided adjacent thereto.

6. The prism unit of claim 5, wherein a mean absorptance of every 40 mm thickness of the prism base member in a wavelength range from 400 nm to 800 nm is 0.5% or less.

7. The prism unit of claim 6, wherein the high-thermal-conductivity substance is $Al_2O_3$, either the first or second dichroic film reflecting red light and containing 50% by volume or more of $Al_2O_3$.

8. The prism unit of claim 7, wherein the high-thermal-conductivity substance is $Al_2O_3$, either the first or second dichroic film reflecting blue light and containing 30% by volume or more of $Al_2O_3$.

9. The prism unit of claim 1, wherein variation of a cut-off frequency at which a transmittance of 50% is obtained 1 nm or less within a humidity range from 0% to 95% and within a temperature range of ±25C.

10. The prism unit of claim 1, wherein, for each of the dichroic films, an air gap layer is provided adjacent thereto.

11. The prism unit of claim 1, wherein a mean absorptance of every 40 mm thickness of the prism base member in a wavelength range from 400 nm to 800 nm is 0.5% or less.

12. The prism unit of claim 1, wherein the high-thermal-conductivity substance is $Al_{12}O_3$, either the first or second dichroic film reflecting red light and containing 50% by volume or more of $Al_{12}O_3$.

13. The prism unit of claim 1, wherein the high-thermal-conductivity substance is $Al_2O_3$, either the first or second dichroic film reflecting blue light and containing 30% by volume or more of $Al_2O_3$.

14. An image projection apparatus comprising:
   a light source for emitting white light;
   the prism unit according to claim 1;
   a first image display device that modulates a first light having a first wavelength band from the prism unit and that reflects the modulated first light to the prism unit;
   a second image display device that modulates a second light having a second wavelength band from the prism unit and that reflects the modulated second light to the prism unit;
   a third image display device that modulates a third light having a third wavelength band from the prism unit and that reflects the modulated third light to the prism unit; and
   a projection optical system that projects onto a projection surface that modulated lights integrated by the prism unit.

\* \* \* \* \*